United States Patent
Chen et al.

(10) Patent No.: US 9,677,610 B2
(45) Date of Patent: Jun. 13, 2017

(54) LINEAR GUIDEWAY AND END MODULE THEREOF

(71) Applicant: OME TECHNOLOGY CO., LTD., New Taipei (TW)

(72) Inventors: Hung-Ching Chen, New Taipei (TW); Jia-Sin Lai, New Taipei (TW)

(73) Assignee: OME TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 14/986,687

(22) Filed: Jan. 3, 2016

(65) Prior Publication Data
US 2017/0097041 A1   Apr. 6, 2017

(30) Foreign Application Priority Data

Oct. 2, 2015 (TW) .............................. 104215834 U

(51) Int. Cl.
F16C 29/06 (2006.01)
F16C 33/10 (2006.01)

(52) U.S. Cl.
CPC ...... *F16C 29/0642* (2013.01); *F16C 29/0609* (2013.01); *F16C 29/0659* (2013.01); *F16C 29/0671* (2013.01)

(58) Field of Classification Search
CPC .... F16C 29/005; F16C 29/06; F16C 29/0602; F16C 29/0611; F16C 29/0633; F16C 29/0652; F16C 29/0657; F16C 29/0669; F16C 29/0671; F16C 29/0673
See application file for complete search history.

(56) References Cited

U.S. PATENT DOCUMENTS

| 8,220,997 | B2 * | 7/2012 | Chen | F16C 29/0609 384/45 |
| 2002/0021847 | A1 * | 2/2002 | Wu | F16C 29/0607 384/45 |
| 2009/0245701 | A1 * | 10/2009 | Ogura | F16C 29/086 384/15 |
| 2013/0177267 | A1 * | 7/2013 | Tsao | F16C 29/0657 384/43 |

FOREIGN PATENT DOCUMENTS

| JP | EP 1114941 A1 * | 7/2001 | ............. F16C 29/06 |
| TW | DE 202014103812 U1 * | 9/2014 | ......... F16C 33/6648 |

* cited by examiner

*Primary Examiner* — Phillip A Johnson
(74) *Attorney, Agent, or Firm* — Li & Cai Intellectual Property (USA) Office

(57) ABSTRACT

An end module of a linear guideway includes an end cap, a cover, and a lubricating sheet. The end cap has an accommodating trough, and the cover is installed on the end cap to cover the accommodating trough, so a surface of the end cap faces a surface of the cover. At least one supporting pillar is formed on one of the two facing surfaces of the end cap and the cover, and the supporting pillar abuts against the other one of the two facing surfaces of the end cap and the cover. The lubricating sheet is received in the accommodating trough. The lubricating sheet has at least one penetrating hole, and the supporting pillar is inserted into the penetrating hole. Thus, the lubricating sheet of the instant disclosure is provided without any deformation, which is caused by the end cap and the cover.

10 Claims, 11 Drawing Sheets

LINEAR GUIDEWAY AND END MODULE THEREOF

BACKGROUND OF THE INVENTION

1. Field of the Invention

The instant invention relates to a guideway; in particular, to a linear guideway and an end module of a linear guideway.

2. Description of Related Art

The miniature linear guideway is defined by its size, but also can include the linear guideway having wire holders. Moreover, the spherical rollers in the miniature linear guideways are not fixed by any chains or belts. Specifically, the conventional miniature linear guideway defines a circulation channel via the slider, the circulator, and the wire holders, and the circulator is an integrally formed single piece and is engaged with the slider by directly pressing the circulator onto the slider.

Moreover, the conventional miniature linear guideway includes two end modules respectively installed on two opposite sides of the slider. Specifically, each conventional end module has a lubricating sheet. When the conventional end module is assembled, the lubricating sheet easily generates a deforming problem to lose the original lubricating effect.

SUMMARY OF THE INVENTION

The instant disclosure provides a linear guideway, a circulating module, and an end module thereof for effectively improving the problem generated by the conventional miniature linear guideway.

The instant disclosure provides a linear guideway, comprising: an elongated rail defining a longitudinal direction; a slider having a groove movably disposed on the rail, wherein the slider two elongated inner loading surfaces arranged on two inner surfaces of the groove facing with each other, wherein each one of the two inner loading surfaces parallels the longitudinal direction; a circulator having two circulating bases respectively arranged at two opposite sides of the groove, wherein the two circulating bases are respectively corresponding to and connected to the two inner loading surfaces of the groove, and each circulating base comprises: an outer loading surface defining an external channel and arranged outside the corresponding inner loading surface; and two corner portions respectively extended from two opposite ends of the outer loading surface toward two opposite ends of the corresponding inner loading surface; two wire holders respectively corresponding in position to the two inner loading surfaces, and each wire holder and the corresponding inner loading surface co-defining an internal channel; two end modules disposed on the rail and respectively fixed on two opposite ends of the circulator, each end module comprising: an end cap and a cover, wherein the end cap has two retaining troughs formed on a surface thereof and an accommodating trough formed an opposite surface thereof, the cover is installed on the end cap to cover the accommodating trough, so a surface of the end cap faces a surface of the cover, wherein at least one supporting pillar is formed on one of the two facing surfaces of the end cap and the cover, and the supporting pillar abuts against the other one of the two facing surfaces of the end cap and the cover; and a lubricating sheet received in the accommodating trough and partially protruding from the accommodating trough, wherein the lubricating sheet has at least one penetrating hole, the supporting pillar is inserted into the penetrating hole, and a portion of the lubricating sheet protruding from the accommodating trough abuts against the rail; wherein the corner portions of the two circulating bases are respectively inserted into the retaining troughs of the two end modules, and each corner portion and the corresponding retaining trough co-define a corner channel, wherein each internal channel, the corresponding two corner channels, and the corresponding external channel are defined as a circulation channel; and a plurality of rollers respectively received in the two circulation channels.

In summary, when a screw (not shown) fixes the cover onto the end cap, the free end of the supporting pillar abuts against the bottom wall of the accommodating trough, thereby preventing a deforming problem from occurring to the lubricating sheet if the screw inserts into the penetrating hole too deep. That is to say, the different assembling process of the end module does not influence the shape of the lubricating sheet, thereby maintaining the predetermined lubricating function of the lubricating sheet. The free ends of the two supporting pillars are respectively corresponding in position to the two hook troughs of the end cap, thus the hooks of the wire holder arranged in the corresponding hook troughs can be limited.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Please refer to FIGS. 1 through 12, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

Figure 1:
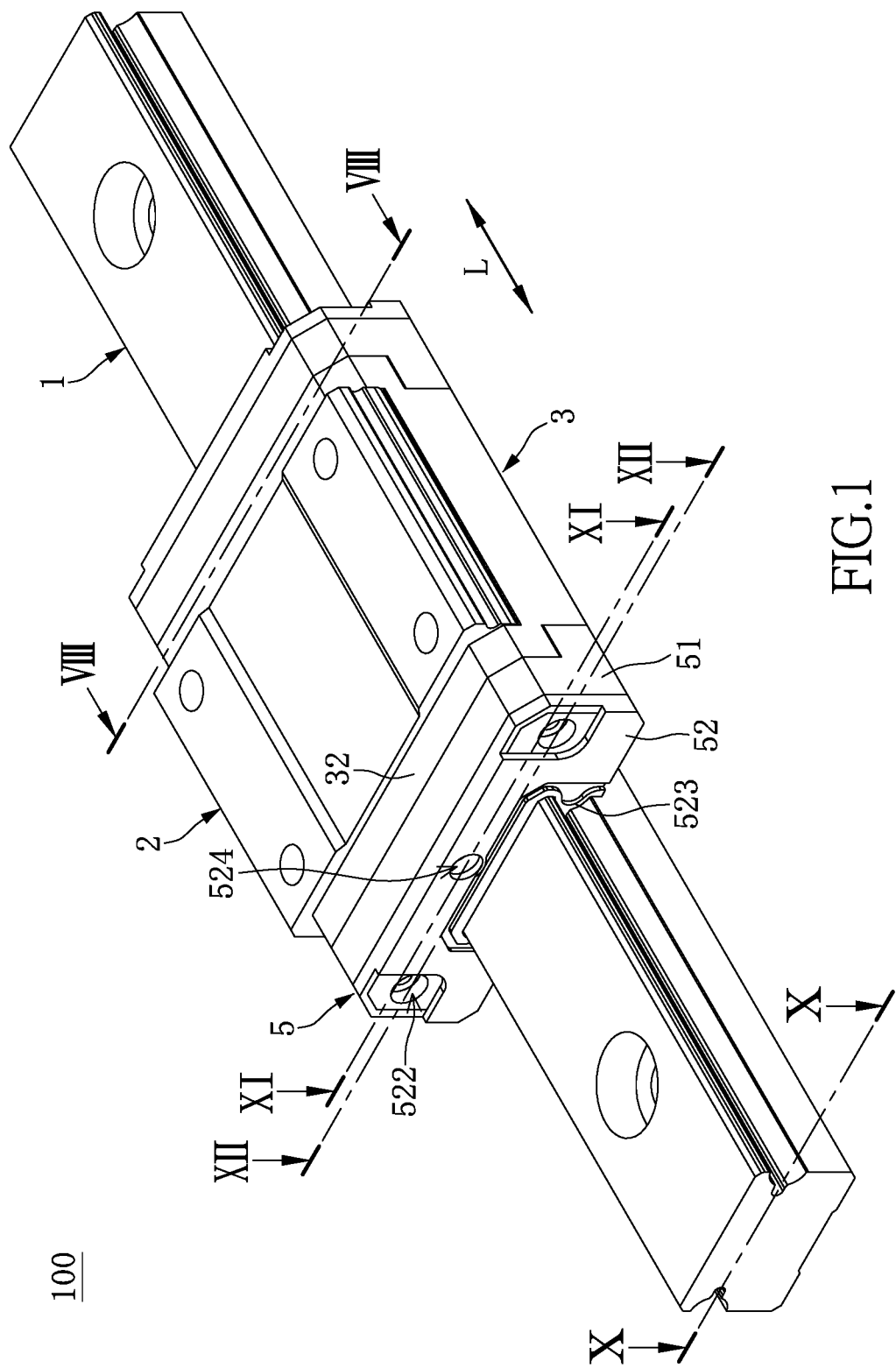
FIG. 1 is a perspective view showing a linear guideway according to the instant disclosure.
Figure 2:
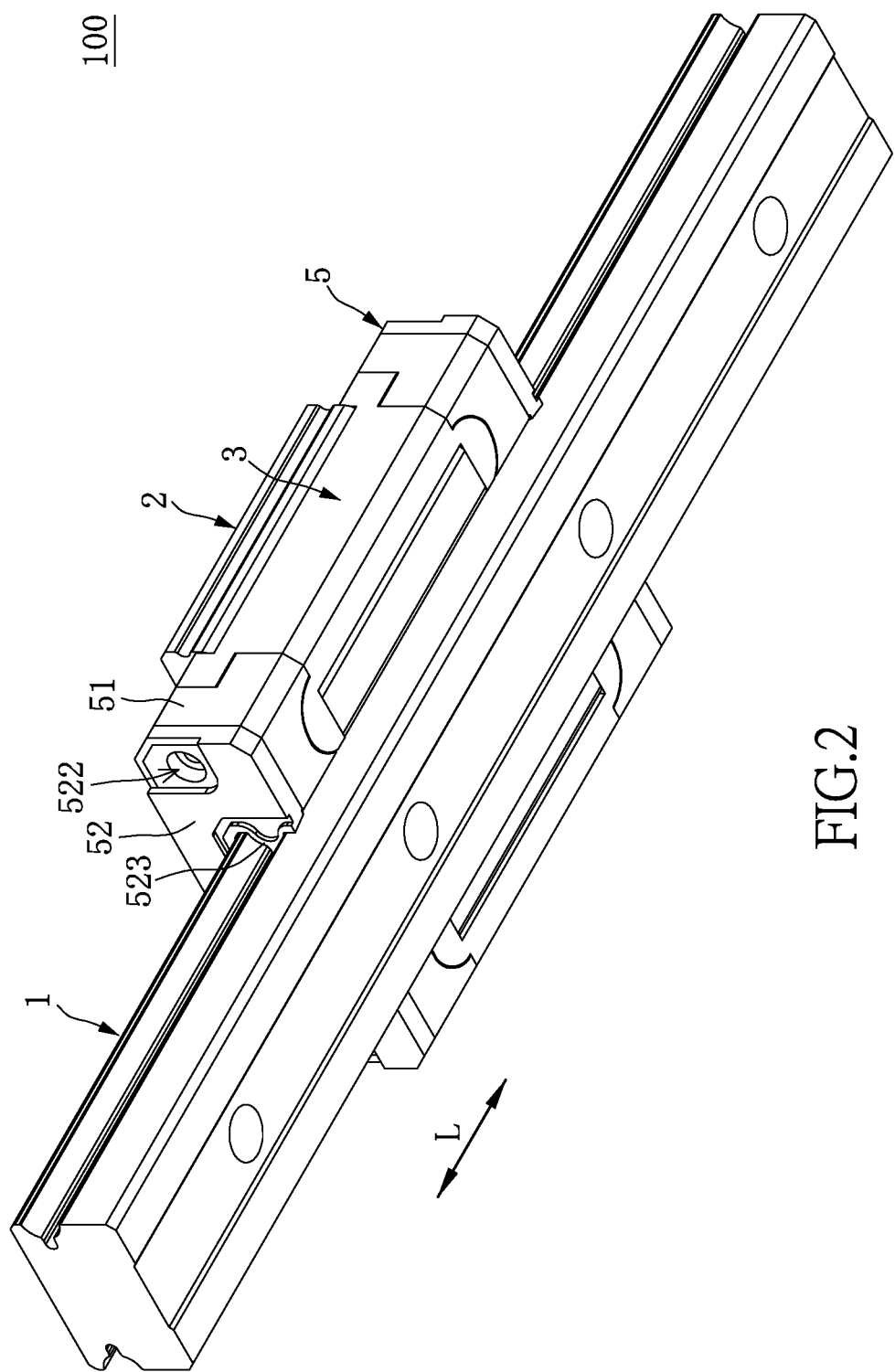
FIG. 2 is a perspective view of FIG. 1 from another perspective.
Figure 10:
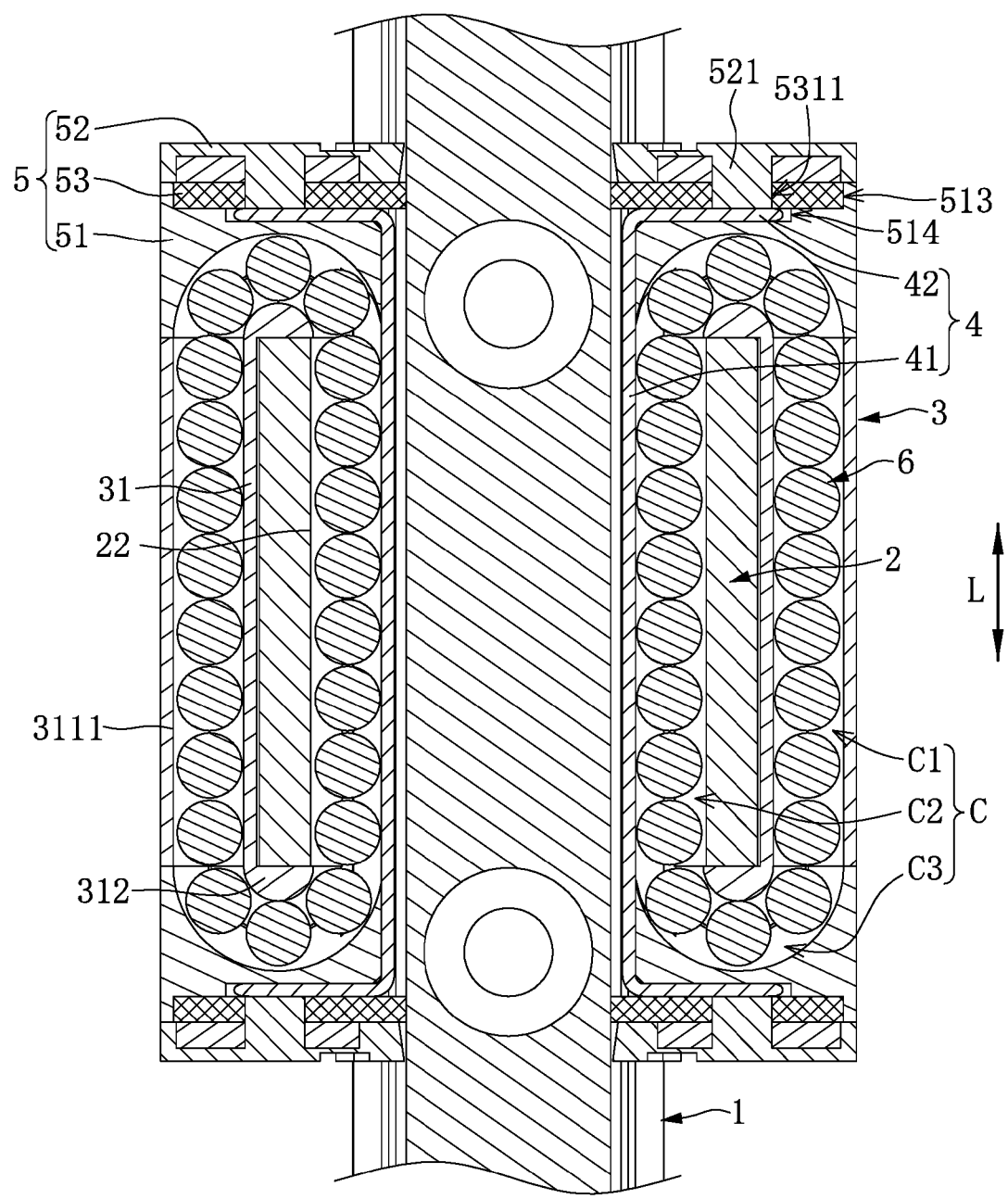
FIG. 10 is a cross-sectional view of FIG. 1 along a cross-sectional line X-X.

Please refer to FIGS. 1 and 2, and with reference occasionally made to FIG. 10. The instant embodiment provides a linear guideway 100, in particular, to a miniature linear guideway 100, but it is not limited thereto. The linear guideway 100 includes an elongated rail 1, a slider 2, a circulator 3, two wire holders 4, two end modules 5, and a plurality of rollers 6. The rail 1 defines a longitudinal direction L. The circulator 3 and the two end modules 5 are installed on the slider 2, and the two wire holders 4 are installed on the two end modules 5, thereby the above components co-define two circulation channels C. The rollers 6 in the instant embodiment are a plurality of spherical rollers 6, and the rollers 6 are respectively and rollably arranged in the two circulation channels C. The slider 2 and the components installed thereon are slidably disposed on the rail 1 along the longitudinal direction L. The following description discloses the construction of each component of the linear guideway 100, and then discloses the relationship of the components.

Figure 3:
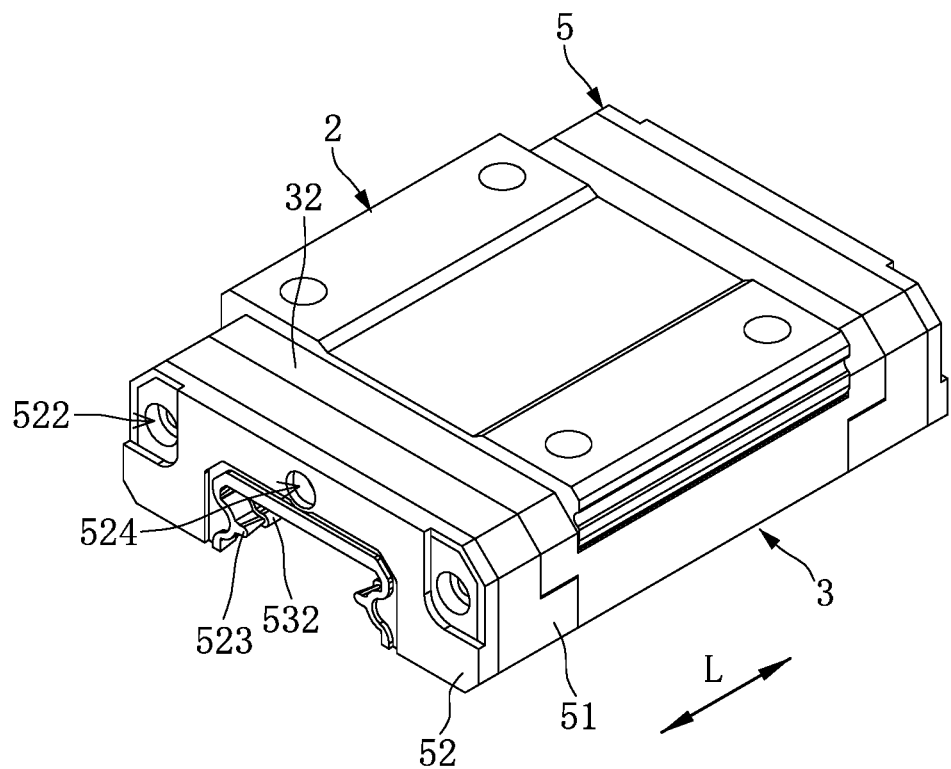
FIG. 3 is a perspective view showing part of FIG. 1.
Figure 4:
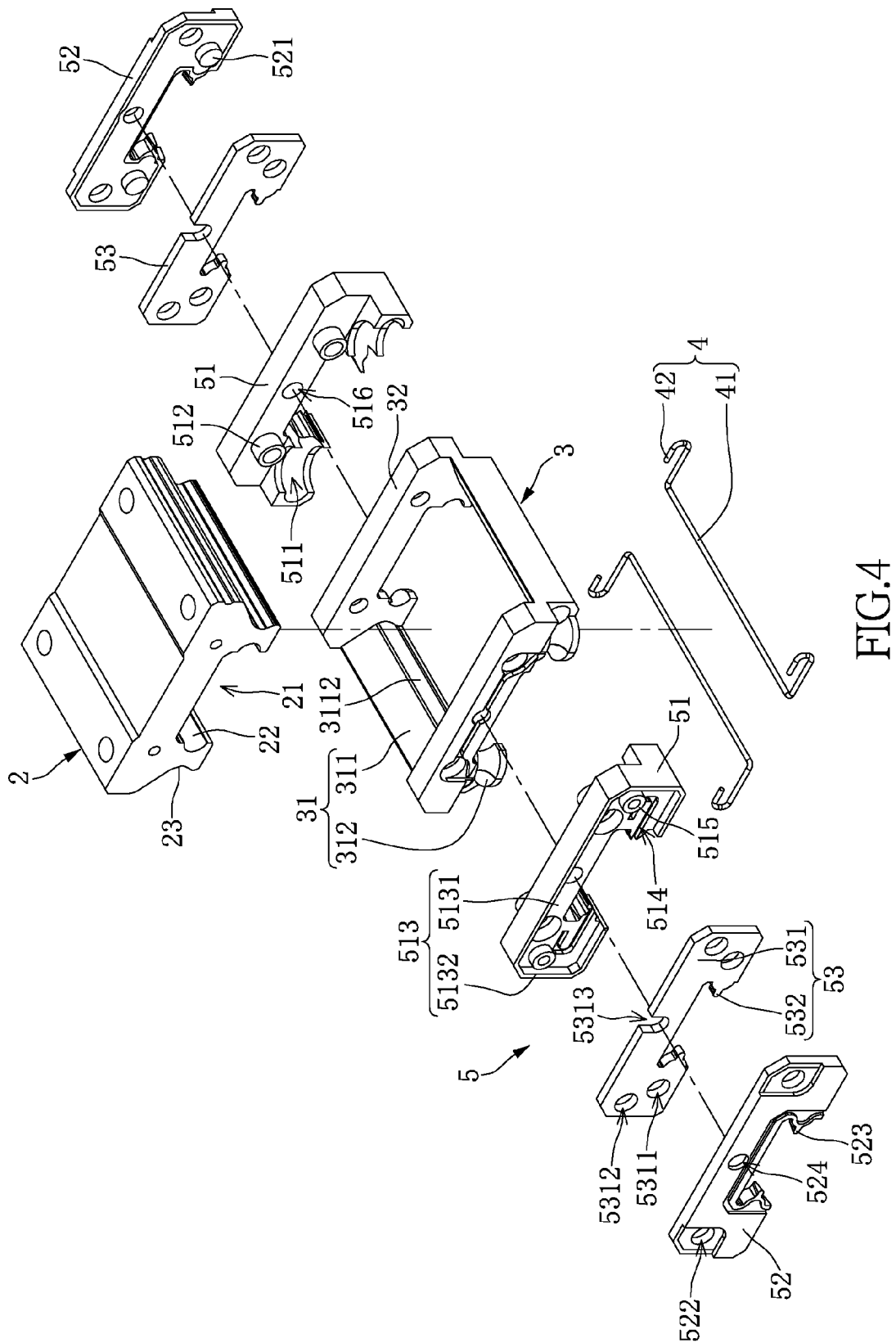
FIG. 4 is an exploded view of FIG. 3.
Figure 5:
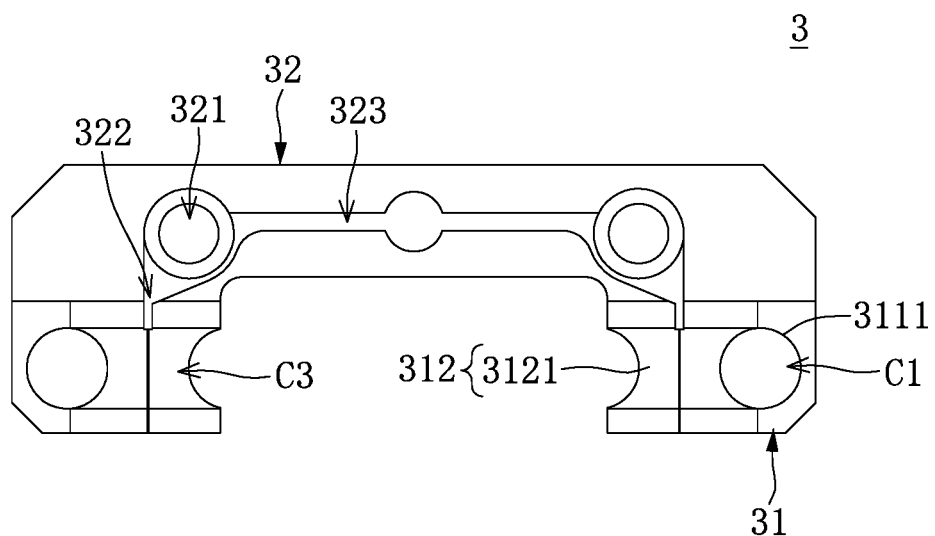
FIG. 5 is a planar view showing a circulator of FIG. 3.
Figure 6:
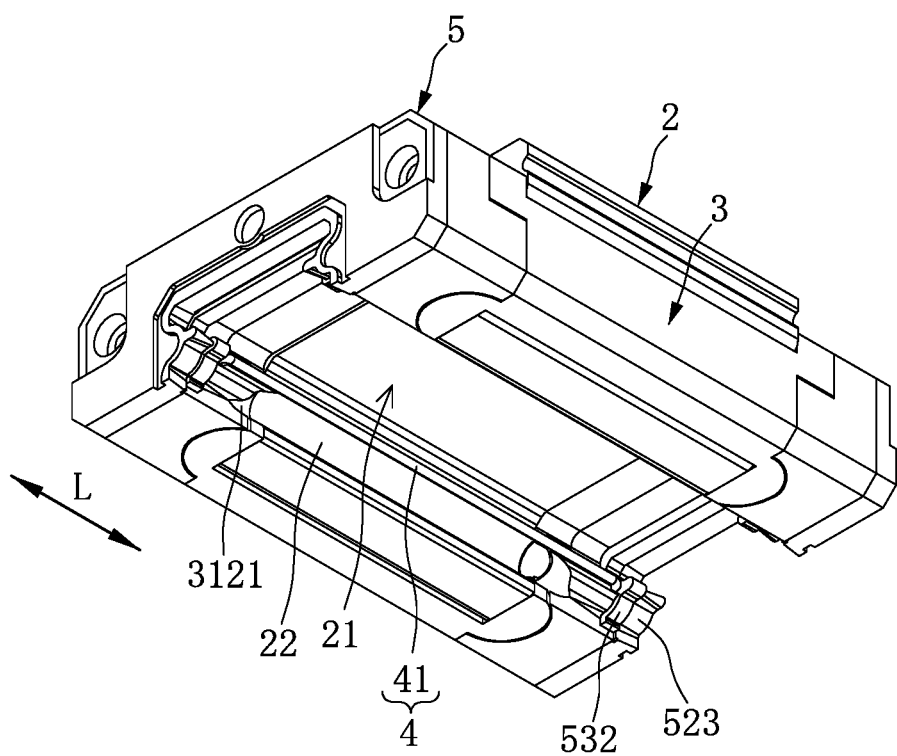
FIG. 6 is a perspective view showing part of FIG. 2.
Figure 7:
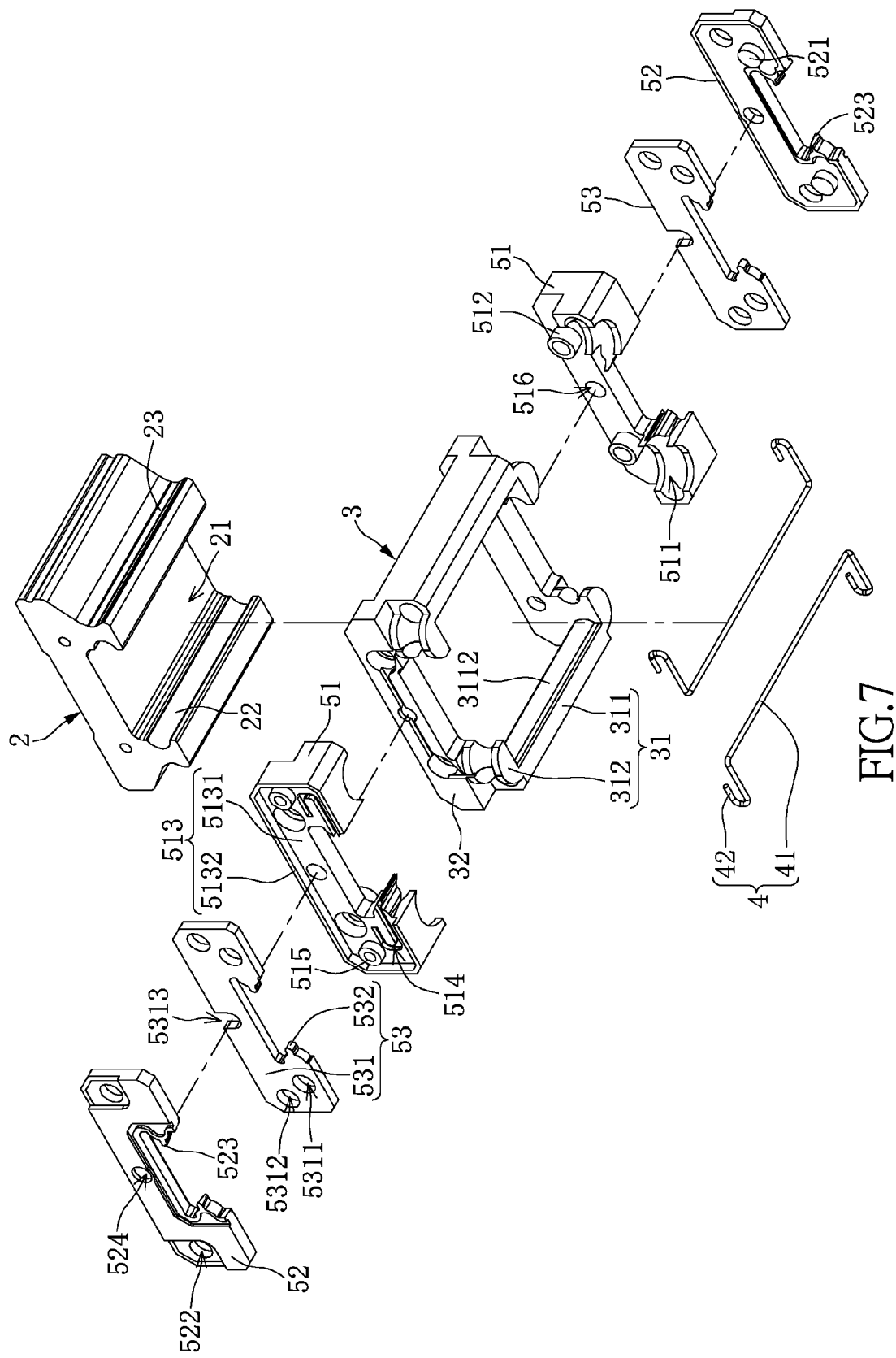
FIG. 7 is an exploded view of FIG. 6.
Figure 8:
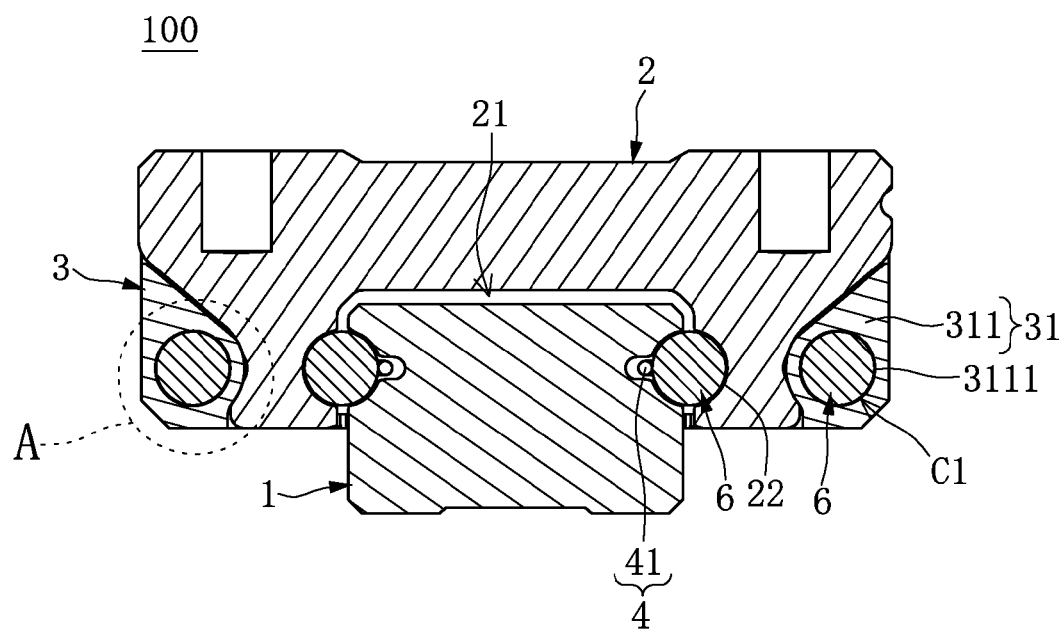
FIG. 8 is a cross-sectional view of FIG. 1 along a cross-sectional line VIII-VIII.

Please refer to FIGS. 3 through 5, and with reference occasionally made to FIGS. 6 and 7. A groove 21 is concavely formed on the slider 2 along the longitudinal direction L. A cross-section of the slider 2 perpendicular to the longitudinal direction L has a symmetrical π shape (as shown in FIG. 8). The groove 21 of the slider 2 is movably disposed on the rail 1. Two facing inner surfaces of the groove 21 each has an inner loading surface 22 parallel to the longitudinal direction L, and the slider 2 has two carrying surfaces 23, which are parallel to the longitudinal direction L, respectively arranged at two opposite sides of the two inner loading surfaces 22.

Figure 9:
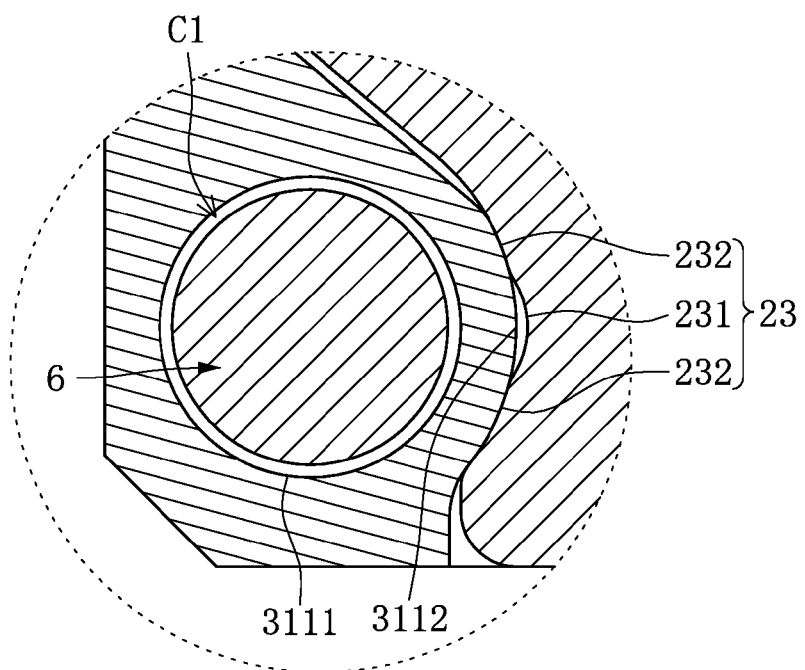
FIG. 9 is an enlarged view showing the portion A of FIG. 8.

As shown in FIGS. 8 and 9, each carrying surface 23 has a first circular-arc segment 231 and two second circular-arc segments 232 respectively at two opposite sides of the first circular-arc segment 231. The first and second circular-arc segments 231, 232 of each carrying surface 23 each has an elongated shape, which is parallel to the longitudinal direction L. In a cross-section of the slider 2 perpendicular to the longitudinal direction L, a radius of each first circular-arc segment 231 is smaller than that of each second circular-arc segment 232, the two second circular-arc segments 232 of each carrying surface 23 each has a circle center, and the two circle centers of the second circular-arc segments 232 of each carrying surface 23 are overlapped.

As shown in FIG. 4, the circulator 3 in the instant embodiment is an integrally formed single piece, and the circulator 3 includes two elongated circulating bases 31 and two bridges 32 connecting the two circulating bases 31. The slider 2 is inserted into a space surrounded by the two circulating bases 31 and the two bridges 32. The two circulating bases 31 are respectively arranged at two opposite sides of the groove 21 of the slider 2 (i.e., the left outer side and the right outer side of the groove 21 shown in FIG. 8), the two circulating bases 31 are respectively connected to the two inner loading surfaces 22 of the groove 21 (as shown in FIG. 10). That is to say, each circulating base 31 is corresponding in position to one inner loading surface 22 and one carrying surface 23 (as shown in FIGS. 8 and 9). Moreover, the two circulating bases 31 in the instant embodiment have the same construction, so the following description mainly discloses the construction of single circulating base 31 and the corresponding inner loading surface 22.

As shown in FIGS. 4 and 5, the circulating base 31 includes a tubular main portion 311 and two corner portions 312 respectively extended from two opposite ends of the main portion 311. An external channel C1 is penetratingly formed in the main portion 311. Specifically, as shown in FIGS. 8 and 9, the main portion 311 has an outer loading surface 3111, which surroundingly defines the external channel C1, and the outer loading surface 3111 is arranged outside the corresponding inner loading surface 22. Moreover, the main portion 311 has an inner circular-arc surface 3112 arranged at an inner side of the outer loading surface 3111, and the inner circular-arc surface 3112 has an elongated shape parallel to the longitudinal direction L. A cross-section of the inner circular-arc surface 3112 perpendicular to the longitudinal direction L has a circular-arc edge.

As shown in FIGS. 4, 5, and 10, the two corner portions 312 are respectively extended from two opposite ends of the outer loading surface 3111 toward two opposite ends of the inner loading surface 22, and the two corner portions 312 are approximately arranged between two virtual surfaces, which are respectively extending from the outer loading surface 3111 and the inner loading surface 22 in the longitudinal direction L. Each corner portion 312 has a circular-arc-shaped corner surface 3121, which is extending from the corresponding end of the outer loading surface 3111 toward the end of the inner loading surface 22. A cross-section of each corner surface 3121 perpendicular to the longitudinal direction L has a semicircular edge. In other words, one end of the corner surface 3121 is integrally connected to the corresponding outer loading surface 3111, and the other end of the corner surface 3121 is seamlessly connected to the corresponding inner loading surface 22, thus the rollers 6 can smoothly roll between the corner surface 3121 and the corresponding inner loading surface 22 (as shown in FIG. 10).

The longitudinal axis of each bridge 32 is perpendicular to the longitudinal direction L. One of the ends of the two bridges 32 (i.e., the left ends of the two bridges 32 shown in FIG. 4) is respectively connected to the two corner portions 312 of one of the circulating bases 31, and the other end of the two bridges 32 (i.e., the right ends of the two bridges 32 shown in FIG. 4) is respectively connected to the two corner portions 312 of the other circulating base 31.

Specifically, as shown in FIGS. 8 and 9, a smallest distance between the inner circular-arc surfaces 3112 of the two circulating bases 31 is slightly smaller than a distance between one of the second circular-arc segments 232 of each carrying surface 23 and the adjacent second circular-arc segment 232 of the other carrying surface 23. Accordingly, when the slider 2 is inserted into the space defined by the two circulating bases 31 and the two bridges 32, the two carrying surfaces 23 stretch a distance between the two inner circular-arc surfaces 3112, each inner circular-arc surface 3112 is abutted against the two second circular-arc segments 232 of the corresponding carrying surface 23, and a gap is formed between each inner circular-arc surface 3112 and the corresponding first circular-arc segment 231. In a cross-section of the slider 2 and the circulator 3, which is perpendicular to the longitudinal direction L, the two circle centers of the second circular-arc segments 232 of each carrying surface 23 are overlapped at a circle center of the abutted inner circular-arc surface 3112, but the instant disclosure is not limited thereto.

Thus, the two circulating bases 31 are stretched by inserting the slider 2 into the circulator 3, and the second circular-arc segments 232 of the slider 2 are seamlessly abutted against the inner circular-arc surface 3112 of the two circulating bases 31, so that the slider 2 and the circulator 3 are firmly combined with each other for preventing the relative position between the circulator 3 and the slider 2 from changing when the slider 2 is inserted into the circulator 3. Moreover, the combination of the slider 2 and the circulator 3 in the instant embodiment can be used to absorb a tolerance, which is generated by manufacturing the slider 2 or the circulator 3, so the combination of the slider 2 and the circulator 3 can achieve a high precision requirement.

Additionally, as shown in FIG. 5, a surface of each bridge 32 arranged away from the slider 2 (i.e., a surface of each bridge 32 faces the adjacent end cap 51) has two thru-holes 321, two guiding openings 322 respectively in air communication with the two thru-holes 321, and an oil passage 323 in air communication with the two thru-holes 321 and the two guiding openings 322.

The combination of the slider 2 and the circulator 3 in the instant embodiment is defined as a circulating module (not labeled), and the slider 2 and the circulator 3 can be combined with or without at least one screw. Moreover, the circulating module in the instant embodiment can be a circulating module of a miniature linear guideway 100, but it is not limited thereto.

As shown in FIGS. 4 and 10, the wire holder 4 has a straight portion 41 and two J-shaped hooks 42 respectively and curvedly extended from two opposite ends of the straight portion 41. In other words, each wire holder 4 includes two J-shaped hooks 42 respectively arranged on two opposite portions thereof. Specifically, the two wire holders 4 are respectively arranged close to the two inner loading surfaces 22, each straight portion 41 is parallel to the longitudinal direction L. A projecting area of each straight portion 41, which is defined by orthogonally projecting the straight portion 41 onto the corresponding inner loading surface 22, is located on the center position of the corresponding inner loading surface 22 (as shown in FIG. 8). Each hook 42 is located on a virtual plane, which is perpendicular to the longitudinal direction L.

Accordingly, the straight portion 41 of each wire holder 4 and the corresponding inner loading surface 22 co-define an internal channel C2. The rollers 6 arranged in each internal channel C2 are in contact with the corresponding straight portion 41 and the corresponding inner loading surface 22, thus the rollers 6 can stably roll in the internal channels C2.

As shown in FIGS. 4 and 7, the two end modules 5 are movably disposed on the rail 1 and are respectively arranged at two opposite sides of the circulator 3. Each end module 5 includes an end cap 51, a cover 52, and a lubricating sheet 53. The two end caps 51 are sleeved at the rail 1, and the two end caps 51 are respectively fixed on two opposite portions of the circulator 3 (i.e., the two bridges 32 of the circulator 3 shown in FIG. 4). Moreover, the two end modules 5 in the instant embodiment have the same construction, so the following description mainly discloses the construction of a single end module 5.

The end cap 51 has two circular-arc shaped retaining troughs 511 separated from each other, two fixing tubes 512, an accommodating trough 513, two J-shaped hook troughs 514, and two positioning tubes 515. The two retaining troughs 511 and the two fixing tubes 512 are formed on a side part of the end cap 51 arranged adjacent to the slider 2 (i.e., the left side part of the right end cap 51 shown in FIG. 4), and the accommodating trough 513 is concavely formed on an opposite side part of the end cap 51 arranged away from the slider 2 (i.e., the left side part of the left end cap 51 shown in FIG. 4). The two hook troughs 514 are concavely formed on a bottom wall 5131 of the accommodating trough 513, and the two positioning tubes 515 protrude from the bottom wall 5131 of the accommodating trough 513.

Specifically, the accommodating trough 513 having a C shape includes a C-shaped side wall 5132 perpendicularly formed on an outer edge of the bottom wall 5131, and the accommodating trough 513 does not include any wall corresponding in position to an inner edge of the bottom wall 5131. The hook troughs 514 of the two end caps 51 respectively conform in shape to the hooks 42 of the two wire holders 4, and each hook trough 514 is concavely extended from the inner edge of the bottom wall 5131 of the corresponding accommodating trough 513. A height of each positioning tube 515 with respect to the bottom wall 5131 is smaller than or identical to that of the corresponding side wall 5132.

Thus, when the two end caps 51 are respectively fixed on the two opposite portions of the circulator 3, the corner portions 312 of the two circulating bases 31 are respectively inserted into the retaining troughs 511 of the two end caps 51, so each corner portion 312 and the corresponding retaining trough 511 co-define a corner channel C3 (as shown in FIG. 10), and the two adjacent corner channels C3 are respectively in air communication with the two guiding openings 322 of the corresponding bridge 32 (as shown in FIG. 5). Moreover, each internal channel C2, the two corresponding corner channels C3, and the corresponding external channel C1 are defined as the circulation channel C (as shown in FIG. 10).

Figure 11:
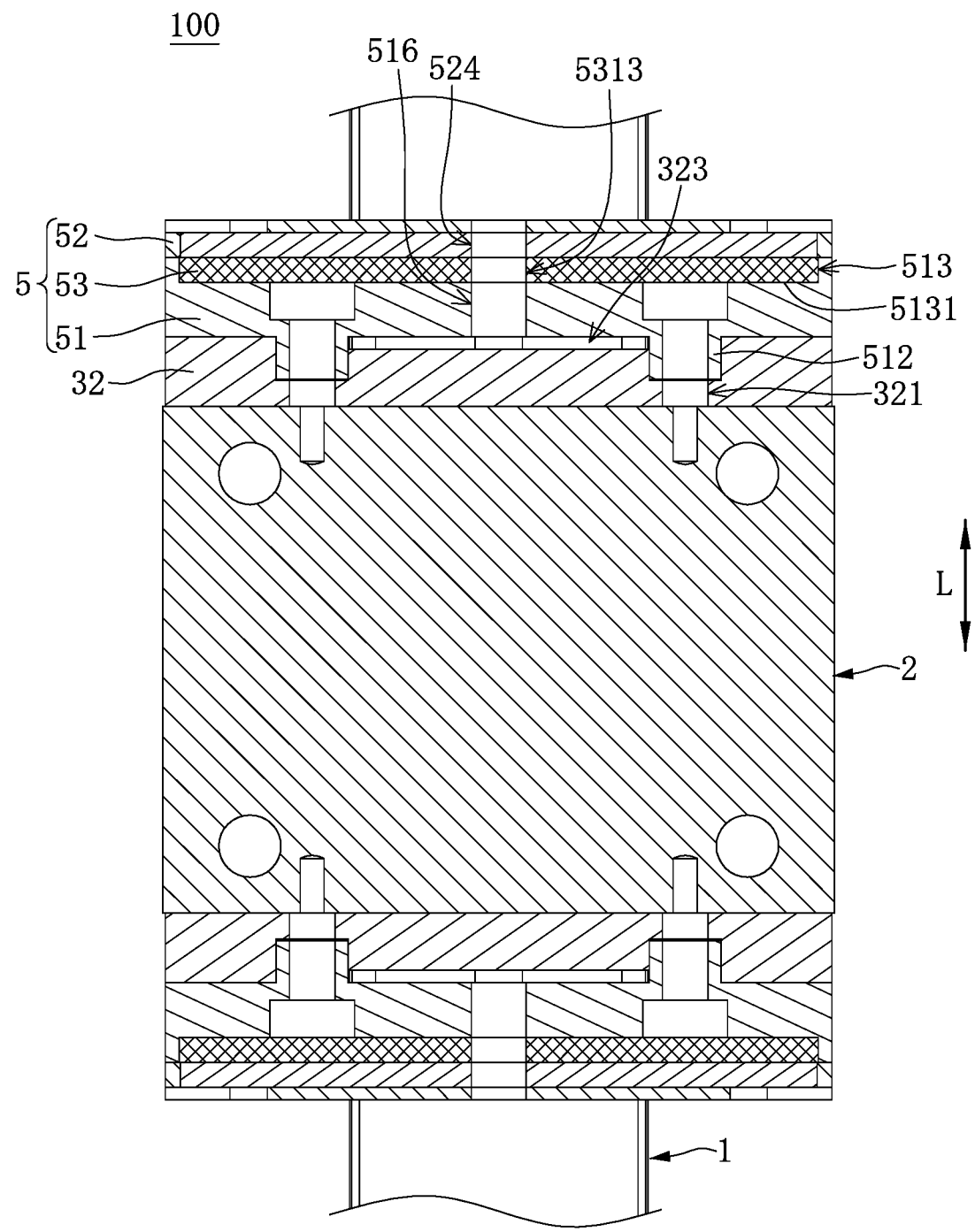
FIG. 11 is a cross-sectional view of FIG. 1 along a cross-sectional line XI-XI.

The two positioning tubes 512 of each end cap 51 are respectively inserted into the two thru-holes 321 of the adjacent bridge 32 (as shown in FIG. 11), thus two screws (not shown) can couple through the two positioning tubes 512 and the corresponding thru-holes 321 to fix on the slider 2. The hooks 42 are respectively received in the hook troughs 514 (as shown in FIG. 10), and the J-shaped hooks 42 are respectively engaged with the J-shaped hook troughs 514, thereby preventing the hooks 42 from separating from the end caps 51 and firmly maintaining the relative position of the two wire holders 4 and the corresponding rollers 6.

Figure 12:
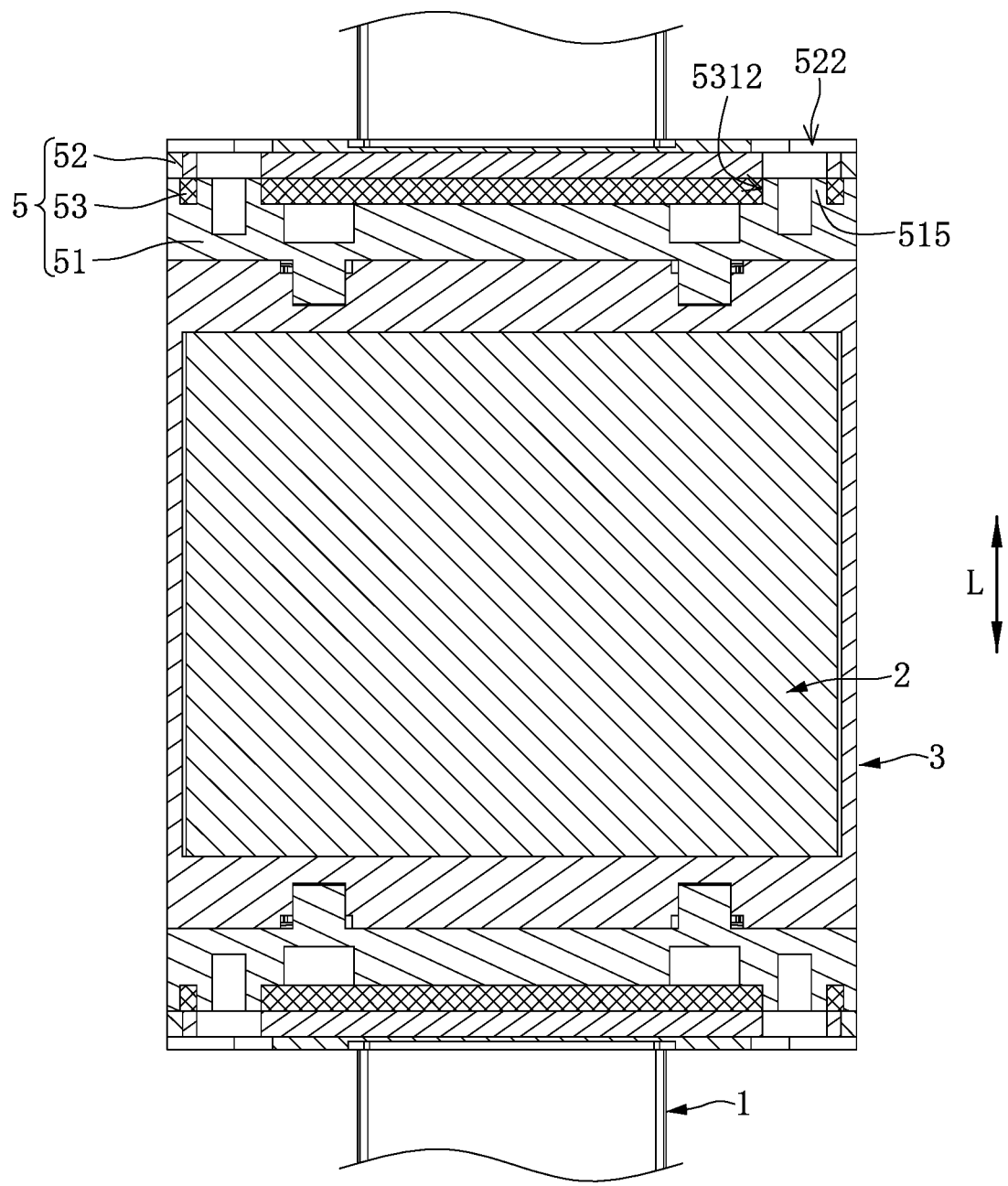
FIG. 12 is a cross-sectional view of FIG. 1 along a cross-sectional line XII-XII.

Please refer to FIGS. 4, 10, and 12. The cover 52 is installed on the end cap 51 to cover the accommodating trough 513. The cover 52 has two supporting pillars 521 formed on a surface thereof (i.e., the left surface of the right end cap 51 shown in FIG. 4) facing the end cap 51. Two screwing holes 522 are respectively formed on two portions of the cover 52, which are corresponding in position to the two positioning tubes 515 of the end cap 51. Specifically, the cover 52 consists of a metal sheet and a plastic member covering the metal sheet (not labeled). The plastic member of the cover 52 has a dust-proofing portion 523 seamlessly abutting against the rail 1, thereby preventing outer dust from entering into the slider 2 to influence the rollers 6.

The lubricating sheet 53 includes a base portion 531 and a lubricating portion 532 extended from the base portion 531. The base portion 531 having a C shape conforms in shape to the accommodating trough 513 of the end cap 51. Two opposite parts of the base portion 531 (i.e., the left part and the right part of the base portion 531 shown in FIG. 4) each has a penetrating hole 5311 and a positioning hole 5312. The lubricating portion 532 is integrally extended from an inner edge of the C-shaped base portion 531.

Moreover, the base portion 531 of the lubricating sheet 53 is received in the accommodating trough 513 of the end cap 51. The lubricating portion 532 of the lubricating sheet 53 protrudes from an inner edge of the accommodating trough 513, which is not formed with any side wall 5132 (as shown in FIG. 6), and the lubricating portion 532 of the lubricating sheet 53 contacts the rail 1 to lubricate the rail 1. The two positioning tubes 515 of the end cap 51 are respectively inserted into the two positioning holes 5312 of the lubricating sheet 53 and are respectively aligned with the two screwing holes 522 of the cover 52 (as shown in FIG. 12), thus two screws (not shown) can respectively couple through the two screwing holes 522 to fix in the two positioning tubes 515.

Moreover, as shown in FIGS. 4 and 10, the two supporting pillars 521 of the cover 52 are respectively inserted into the two penetrating holes 5311 of the lubricating sheet 53, and the free ends of the two supporting pillars 521 abut against the bottom wall 5131 of the accommodating trough 513 and are respectively corresponding in position to the two hook troughs 514 of the end cap 51. Accordingly, when a screw (not shown) fixes the cover 52 onto the end cap 51, the free end of the supporting pillar 521 abuts against the bottom wall 5131 of the accommodating trough 513, thereby preventing a deforming problem from occurring to the lubricating sheet 53 if the screw inserts into the penetrating hole 5311 too deep. That is to say, the different assembling process of the end module 5 does not influence the shape of the lubricating sheet 53, thereby maintaining the predetermined lubricating function of the lubricating sheet 53. The free ends of the two supporting pillars 521 are respectively corresponding in position to the two hook troughs 514 of the end cap 51, thus the hooks 42 of the wire holder 4 arranged in the corresponding hook troughs 514 can be limited.

Furthermore, the number of the fixing tubes 512, the supporting pillars 521, the positioning tubes 515, and the corresponding holes can be changed according to a designer's demand, and the instant disclosure is not limited to the instant embodiment. Although the supporting pillars 521 in the instant embodiment are formed on the cover 52, the supporting pillars 521 in a non-shown embodiment can be formed on the end cap 51 to abut against the cover 52.

Additionally, as shown in FIG. 11, in each end module 5, the end cap 51 and the cover 52 each has an oil-injecting hole 516, 524, the oil-injecting hole 516 of the end cap 51 is in air communication with the oil passage 323 of the adjacent bridge 32, and the base portion 531 of the lubricating sheet 53 has an oil-suction notch 5313 arranged between the two oil-injecting holes 516, 524. Thus, when each end module 5 is injected with a lubricating oil (not shown), the lubricating sheet 53 can absorb enough lubricating oil by the oil-suction notch 5313, and the lubricating oil will flow into the corner channels C3 through the oil-injecting holes 516, 524, the oil passage 323, and the guiding openings 322.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A linear guideway, comprising:
   an elongated rail defining a longitudinal direction;
   a slider having a groove movably disposed on the rail, wherein the slider has two elongated inner loading surfaces arranged on two inner surfaces of the groove facing each other, wherein each one of the two inner loading surfaces parallels the longitudinal direction;
   a circulator having two circulating bases respectively arranged at two opposite sides of the groove, wherein the two circulating bases are respectively corresponding to and connected to the two inner loading surfaces of the groove, and each circulating base comprises:
      an outer loading surface defining an external channel and arranged outside the corresponding inner loading surface; and
      two corner portions respectively extended from two opposite ends of the outer loading surface toward two opposite ends of the corresponding inner loading surface;
   two wire holders respectively corresponding in position to the two inner loading surfaces, and each wire holder and the corresponding inner loading surface co-defining an internal channel;
   two end modules disposed on the rail and respectively fixed on two opposite ends of the circulator, each end module comprising:
      an end cap and a cover, wherein the end cap has two retaining troughs formed on a surface thereof and an accommodating trough formed an opposite surface thereof, the cover is installed on the end cap to cover the accommodating trough, so the opposite surface of the end cap faces a surface of the cover, wherein at least one supporting pillar is formed on one of the opposite surface of the end cap and the surface of the cover, and the supporting pillar abuts against the other one of the opposite surface of the end cap and the surface of the cover; and
      a lubricating sheet received in the accommodating trough and partially protruding from the accommodating trough, wherein the lubricating sheet has at least one penetrating hole, the supporting pillar is inserted into the penetrating hole, and a portion of the lubricating sheet protruding from the accommodating trough abuts against the rail;
   wherein the corner portions of the two circulating bases are respectively inserted into the retaining troughs of the two end modules, and each corner portion and the corresponding retaining trough co-define a corner channel, wherein each internal channel, the corresponding two corner channels, and the corresponding external channel are defined as a circulation channel; and
   a plurality of rollers respectively received in the two circulation channels.

2. The linear guideway as claimed in claim 1, wherein each wire holder has two J-shaped hooks respectively arranged on two opposite portions thereof, each end cap has two hook troughs concavely formed on a bottom wall of the accommodating trough thereof, and the J-shaped hooks are respectively arranged in the hook troughs, wherein the number of the at least one penetrating hole of each lubricating sheet is two; at each end module, the number of the at least one supporting pillar is two, the two supporting pillar are formed on the cover and are respectively inserted into the two penetrating holes of the lubricating sheet, the ends of the two supporting pillars abut against the bottom wall of the accommodating trough and respectively correspond in position to the two hook troughs.

3. The linear guideway as claimed in claim 2, wherein at each end module, the end cap has at least one positioning tube formed on the bottom wall of the accommodating trough, the lubricating sheet has at least one positioning hole, the cover has at least one screwing hole, the positioning tube is inserted into the positioning hole and is corresponding in position to the screwing hole for providing a screw to fix in the positioning tube by passing through the screwing hole.

4. The linear guideway as claimed in claim 1, wherein the circulator is an integrally formed single piece, the circulator has two bridges each having a first end and an opposite second end, wherein the first ends of the two bridges are respectively connected to the two corner portions of one of the two circulating bases, and the opposite second ends of the two bridges are respectively connected to the two corner portions of the other circulating base, the two end caps respectively abut against the two bridges; each slider has two carrying surfaces respectively arranged at two opposite sides of the two inner loading surfaces, wherein each one of the carrying surfaces has an elongated first circular-arc segment and two elongated second circular segments respectively arranged at two opposite sides of the first circular-arc segment, each one of the first circular-arc segments and the second circular segments parallels the longitudinal direction, wherein in a cross-section of the slider perpendicular to the longitudinal direction, a radius of each first circular-arc segment is smaller than a radius of each second circular-arc segment; each circulating base has an elongated inner circular-arc segment arranged at an inner side of the outer loading surface and parallel to the longitudinal direction; wherein the slider is inserted into a space surrounded by the two circulating bases and the two bridges, the two carrying surfaces stretch a distance between the two inner circular-arc surfaces, each inner circular-arc surface is abutted against the two second circular-arc segments of the corresponding carrying surface, and a gap is formed between each inner circular-arc surface and the corresponding first circular-arc segment.

5. The linear guideway as claimed in claim 4, wherein in a cross-section of the slider and the circulator perpendicular to the longitudinal direction, the two circle centers of the second circular-arc segments of each carrying surface are overlapped at a circle center of the abutted inner circular-arc surface.

6. The linear guideway as claimed in claim 4, wherein a surface of each bridge arranged away from the slider has two thru-holes, two guiding openings respectively in air communication with the two thru-holes, and an oil passage in air communication with the two thru-holes and the two guiding openings, wherein any two adjacent corner channels are respectively in air communication with the two guiding openings of the corresponding bridge; wherein at each end module, the end cap has two fixing tubes formed on the surface thereof having the two retaining troughs, the fixing tubes are respectively inserted into the thru-holes for providing two screws to fix on the slider by passing through the fixing tubes and the thru-holes.

7. The linear guideway as claimed in claim 6, wherein at each end module, the end cap and the cover each has an oil-injecting hole, the oil-injecting hole of the end cap is in air communication with the oil passage of the adjacent bridge, and the lubricating sheet has an oil-suction notch arranged between the two oil-injecting holes of the end cap and the cover.

8. An end module of a linear guideway, comprising:
an end cap and a cover, wherein the end cap has two retaining troughs formed on a surface thereof and an accommodating trough formed an opposite surface thereof, the cover is installed on the end cap to cover the accommodating trough, so the opposite surface of the end cap faces a surface of the cover, wherein at least one supporting pillar is formed on one of the opposite surface of the end cap and the surface of the cover, and the supporting pillar abuts against the other one of the opposite surface of the end cap and the surface of the cover; and
a lubricating sheet received in the accommodating trough and partially protruding from the accommodating trough, wherein the lubricating sheet has at least one penetrating hole, the supporting pillar is inserted into the penetrating hole.

9. The end module of the linear guideway as claimed in claim 8, wherein the end cap has two hook troughs concavely formed on a bottom wall of the accommodating trough thereof, the number of the at least one penetrating hole of the lubricating sheet is two, the number of the at least one supporting pillar is two, the two supporting pillar are formed on the cover and are respectively inserted into the two penetrating holes of the lubricating sheet, the ends of the two supporting pillars abut against the bottom wall of the accommodating trough and respectively correspond in position to the two hook troughs.

10. The end module of the linear guideway as claimed in claim 9, wherein the end cap has at least one positioning tube formed on the bottom wall of the accommodating trough, the lubricating sheet has at least one positioning hole, the cover has at least one screwing hole, the positioning tube is inserted into the positioning hole and is corresponding in position to the screwing hole for providing a screw to fix in the positioning tube by passing through the screwing hole.

* * * * *